United States Patent

Pepper, Jr.

[11] 4,071,691
[45] Jan. 31, 1978

[54] HUMAN-MACHINE INTERFACE APPARATUS

[75] Inventor: William Pepper, Jr., Bethesda, Md.

[73] Assignee: Peptek, Inc., Bethesda, Md.

[21] Appl. No.: 717,192

[22] Filed: Aug. 24, 1976

[51] Int. Cl.² .......................................... G08C 21/00
[52] U.S. Cl. ................................ 178/19; 340/365 C
[58] Field of Search ................. 340/365 C, 146.3 SY, 340/347 AD, 324 R, 324 AD; 178/19, 18

[56] References Cited

U.S. PATENT DOCUMENTS

| | | | |
|---|---|---|---|
| 2,925,467 | 3/1960 | Becker | 178/18 |
| 3,591,718 | 7/1971 | Baxter | 178/19 |
| 3,696,409 | 10/1972 | Braaten | 340/365 C |
| 3,732,369 | 5/1973 | Cotter | 178/18 |
| 3,757,322 | 9/1973 | Barkan et al. | 178/19 |
| 3,836,909 | 9/1974 | Cockerell | 340/365 C |
| 3,916,099 | 10/1975 | Hlady | 178/18 |
| 3,983,322 | 9/1976 | Rodgers | 178/19 |

*Primary Examiner*—Thomas A. Robinson
*Attorney, Agent, or Firm*—Jim Zegeer

[57] ABSTRACT

A human-machine interface apparatus includes a first, or phase, surface with associated circuitry so devised that an alternating electrical field is created above the surface with its phase, relative to a fixed point on the surface, changing continuously along an axis of the surface; a second, or pickup, surface located so that when the operator of the interface apparatus touches the phase surface an electrical signal with phase corresponding to the spot touched is transmitted through the operator's body to the pickup surface; and a phase discriminator with one input connected to the pickup surface and a reference input connected to an alternating voltage source of predetermined phase relationship to the alternating electrical field at a fixed point on the phase surface. The preferred embodiment combines two such apparatuses, sharing common phase and pickup surfaces but operating at different frequencies, to provide outputs corresponding to two orthogonal axes on the phase surface. The phase surface in the preferred embodiment is a square resistive layer on a nonconductive substrate, and the change in phase with position is produced by applying a signal of one frequency to one edge of the square and a signal of the same frequency but different phase to the opposite edge, the remaining two edges similarly being supplied with signals of a second frequency. A level detector provides a third axis output indicating the presence of the operator's finger on the plane. An alternate embodiment uses a sandwich construction of the phase surface to provide the phase shift, with an insulating layer separating a resistive surface layer from a conductive ground plane to provide distributed capacitance and resistance that progressively shift the phase of an applied signal as it travels along the surface. Another embodiment uses multiplexing to measure position in two axes with a single applied frequency and a single phase discriminator.

21 Claims, 6 Drawing Figures

HUMAN-MACHINE INTERFACE APPARATUS

BACKGROUND OF THE INVENTION

This invention relates to devices whereby hand motions are converted into continuously variable electrical signals to provide an interface between man and machine. More specifically this invention relates to phase-sensitive devices in which the location of an operator's finger on a specially constructed plane is determined in one or more axes by the phase of a signal frequency or frequencies relative to the phase of a reference frequency or frequencies.

Presently used electrical control devices of the continuously variable kind involve projecting knobs, handwheels, levers or joysticks. Electrical telewriting generators use a pen or stylus of some kind. Manual input devices that perform analogous functions in data processing systems usually use light pens. A phase-sensitive system described by A. B. E. Ellis in U.S. Pat. No. 3,530,241 uses a capacitively coupled probe that must be held by the operator. All these devices, which produce electrical signals that correspond to hand motions of an operator, require that something be grasped and manipulated by the operator.

My invention eliminates the requirement for grasping and manipulating, permitting a more direct and convenient interface with a machine. In particular, it allows natural and convenient two-axis motions without the mental translation required to use two separate knobs or levers. Additionally, it permits such devices to be constructed without projecting knobs or levers, giving such practical benefits as preventing injury by collision with said knobs or levers, enhancing the esthetic appeal of products by making the controls an integral part of the surfaces of the products, and protecting devices used by the public, such as electronic games, from misuse or vandalism by eliminating projections that can be broken or twisted off. A further advantage is that a "dead-man" feature can conveniently be made part of the device, preventing operation of equipment unless the operator is in the correct position.

BRIEF SUMMARY OF THE INVENTION

In one-axis form, the invention consists of a phase surface and associated circuitry so devised that an alternating electrical field is created above the surface with its phase, relative to a fixed point on the surface, changing continuously along the length of the surface; a pickup surface; and a phase discriminator with one input connected to the pickup surface and a reference input connected to an alternating voltage of predetermined phase relationship to the electrical field at a fixed point on the phase surface.

In operation, the hand of the operator provides electrical coupling from the phase surface to the pickup surface. A finger touches the phase surface while another part of the body, such as the heel of the hand, passes above or touches the pickup surface. The phase of the signal transmitted by the hand from the phase surface to the pickup surface depends on the distance of the point touched by the finger from one end of the phase surface. This phase is measured by the phase discriminator, producing an electrical output that is a function of the position of the operator's finger on the phase surface.

Two or more devices operating at different frequencies can be combined to provide outputs corresponding to position along two or more axes simultaneously. Similarly, one device can provide outputs corresponding to position along two or more axes by multiplexing phase surface connections and output connections.

DETAILED DESCRIPTION

Figure 1:
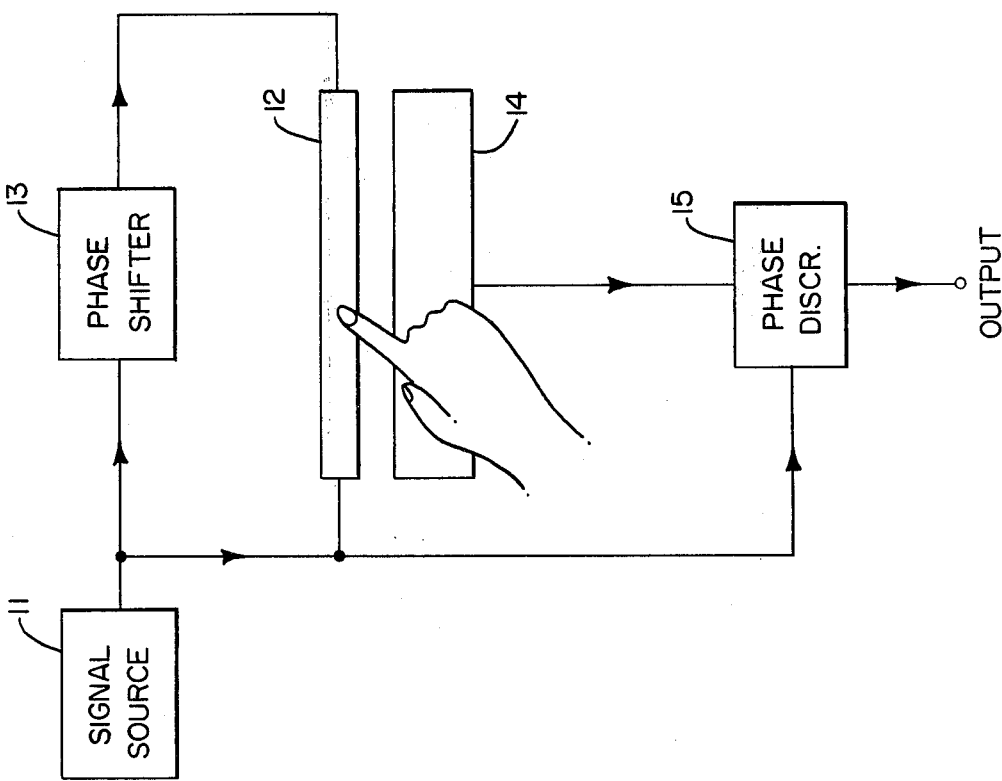
FIG. 1 is a simplified diagrammatic representation of one embodiment of the basic one-axis form of the invention.

Referring to FIG. 1, an alternating voltage source 11, which can conveniently be a multivibrator or oscillator, supplies a signal to one end of phase surface 12. Phase shifter 13 supplies a signal to the other end of the phase surface, said signal being shifted in phase by some angle such as 90 degrees. Phase surface 12 can be of any convenient shape or construction that provides a suitable resistive path between the end connections; one embodiment of the phase surface is a resistive coating deposited on an insulating substrate; another embodiment is a length of resistive material such as Nichrome wire stretched between two terminals. Pickup surface 14 can be metal or some other conductive material and is located so as to pick up the signal from the operator's body and transfer it to phase discriminator 15; the pickup surface can conveniently be located adjacent to phase surface 12 and can completely surround it if desired. Alternatively, pickup surface 14 can be located at some distance to provide special advantages; for instance it can be located where the operator must place one hand on each surface for operator safety in control of dangerous machinery, or it can be located in the driver's seat of a vehicle so the vehicle cannot be moved unless the driver is in his seat. Either phase surface 12 or pickup surface 14, or both, can be covered with a hard insulating layer to protect the underlying layer and limit the current that can flow through the operator's body. Voltage source 11 is also connected to phase discriminator 15, and the phase discriminator compares the phases of its two inputs to produce an electrical output representing the position of the operator's finger on the phase surface. Means of building both analog and digital phase discriminators are well known in the art, providing a choice of outputs to suit particular applications. An electrical filter, amplifier, and/or amplitude limiter can be added to this basic circuit as needed to provide an adequate signal-to-noise ratio and ensure that the phase measurement is independent of the amplitude of the signal at the pickup surface.

In the alternative embodiment shown in FIG. 1, alternating voltage source 16 supplies a signal to one end of phase surface 17. The characteristics of phase surface 17 are such that the phase of the applied signal changes progressively as the signal propagates from the input end to the output end. A terminating resistance 18 is connected from the output end of the phase surface to ground. Pickup surface 19 and phase discriminator 20 are identical in function to pickup surface 14 and phase discriminator 15 in FIG. 1.

Figure 2:
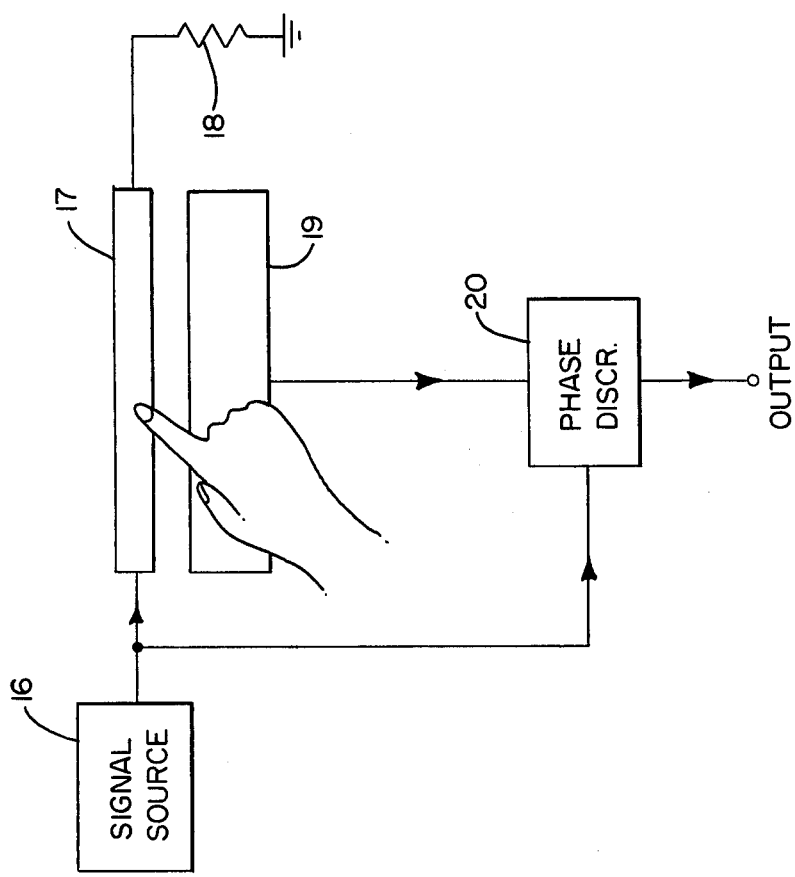
FIG. 2 is a simplified diagrammatic representation of an alternate embodiment of the one-axis form of the invention.
Figure 3:
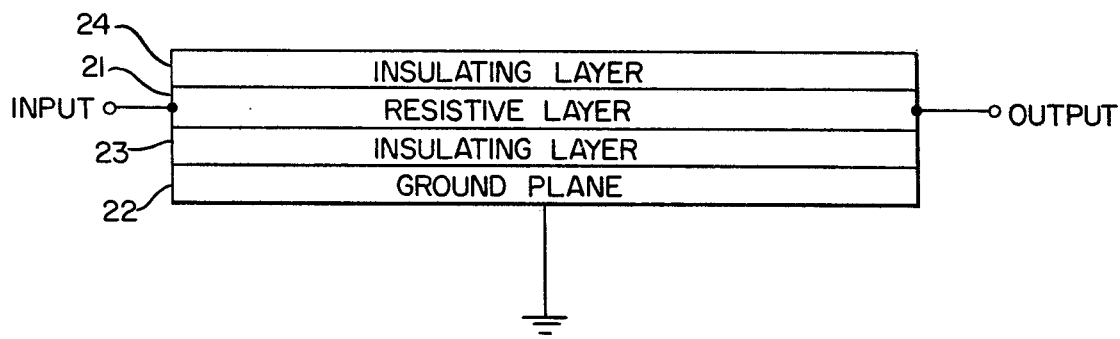
FIG. 3 is a cross-sectional diagram showing the construction of the phase surface of the embodiment of FIG. 2.

FIG. 3 shows in cross-section the construction of phase surface 17 of FIG. 2. A layer of resistive material 21 is separated from a conductive ground plane 22 by an insulating film 23. Input and output connections are provided at opposite ends of resistive layer 21. A hard insulating layer 24 can be placed over the resistive layer to protect the resistive layer and limit the current that can flow through the operator's body.

Figure 4:
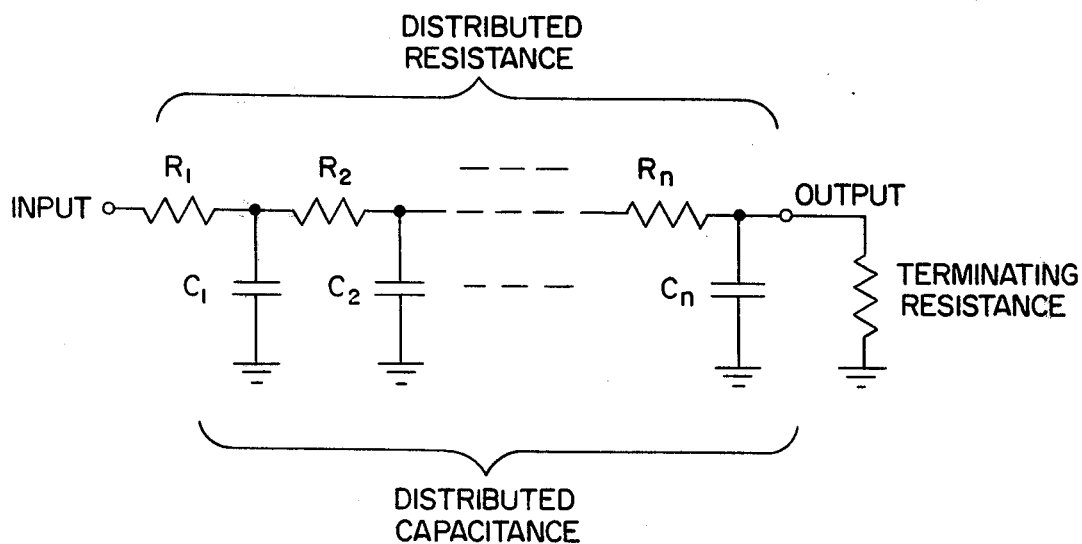
FIG. 4 is a schematic representation of the electrical characteristics of the phase surface of the embodiment of FIG. 2.

FIG. 4 shows schematically the electrical characteristics of phase surface 17 of FIG. 2. Assuming a proper combination of resistances, capacitance, and frequency, the phase of the signal will lag progressively behind the input phase as the signal propagates toward the output connection and the terminating resistance.

Figure 5:
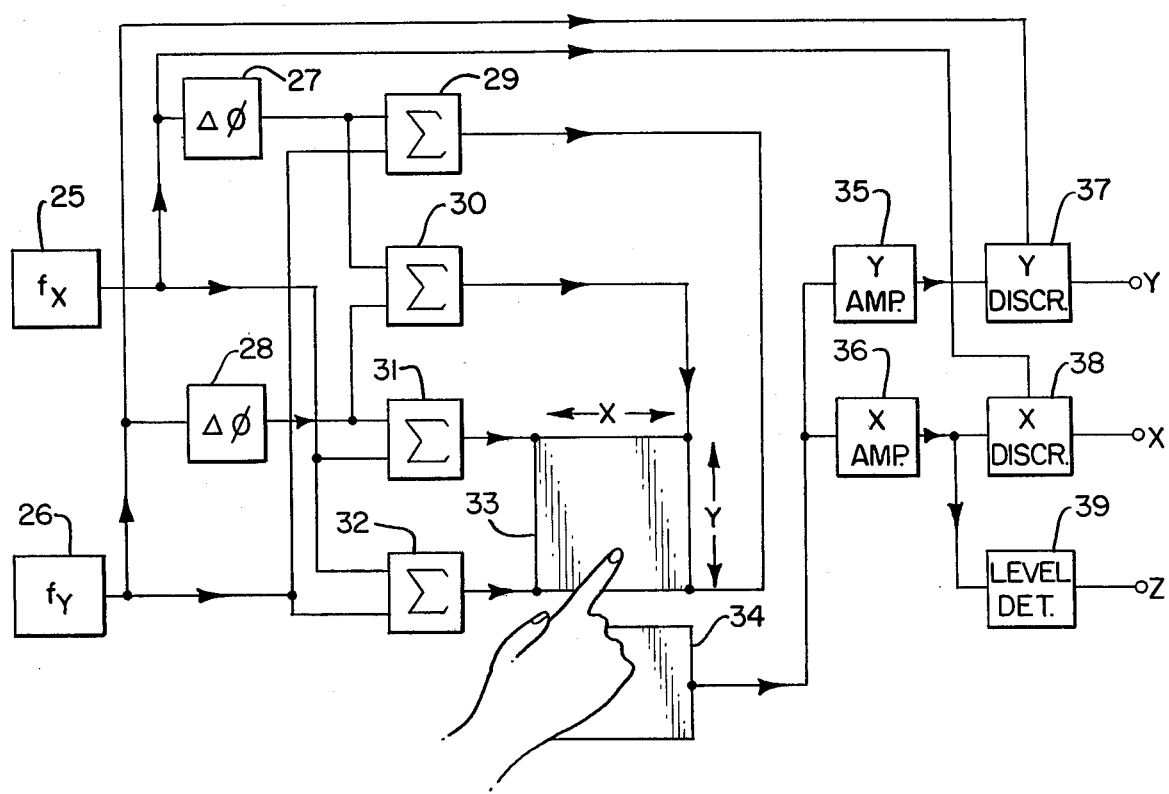
FIG. 5 is a simplified diagrammatic representation of the preferred embodiment of this invention, which provides three output signals indicating the presence of the operator's finger and its position along X and Y coordinates of the phase surface.

FIG. 5 represents the preferred embodiment of the invention. Two different frequencies, $f_X$ and $f_Y$, are generated by oscillators 25 and 26, respectively. Frequency $f_X$ is displaced 90° in phase by phase shifter 27, and frequency $f_Y$ is displaced 90 degrees by phase shifter 28. The four signals thus generated are combined by summing amplifiers 29, 30, 31, and 32, and the combined signals are applied to the corners of phase surface 33 so as to produce two orthogonal phase fields each of which is approximately linear. Arrangements for improving field linearity are described in U.S. Pat. No. 2,925,467 by F. K. Becker.

Adjacent to phase surface 33 is conductive pickup surface 34, which may partially or completely surround the phase surface. These two surfaces can be created simultaneously by spraying or vacuum-depositing resistive material on a flat or curved plastic surface such as the housing of an instrument. Resistivity of the two surfaces can be identical; the terms "resistive" and "conductive" are functional descriptions relative to the impedances of the associated circuitry. Both surfaces are covered with a hard insulating layer.

The low-level signal capacitively coupled through the operator's hand into the pickup surface is fed to two tuned amplifiers, 35 and 36, which respond to frequencies $f_X$ and $f_Y$ respectively. Synchronous detectors 37 and 38 extract the phase information from the two separated signals, providing voltage outputs proportional to the position of the operator's finger along the X and Y axes. Level detector 39 provides a Z-axis binary indication of the presence or absence of the operator's hand. By proper selection of the operating point of the level detector it will either respond when the operator's hand reaches over the pickup plane and touches the phase plane, or will respond only when the heel of the hand is in contact with the pickup surface.

Figure 6:
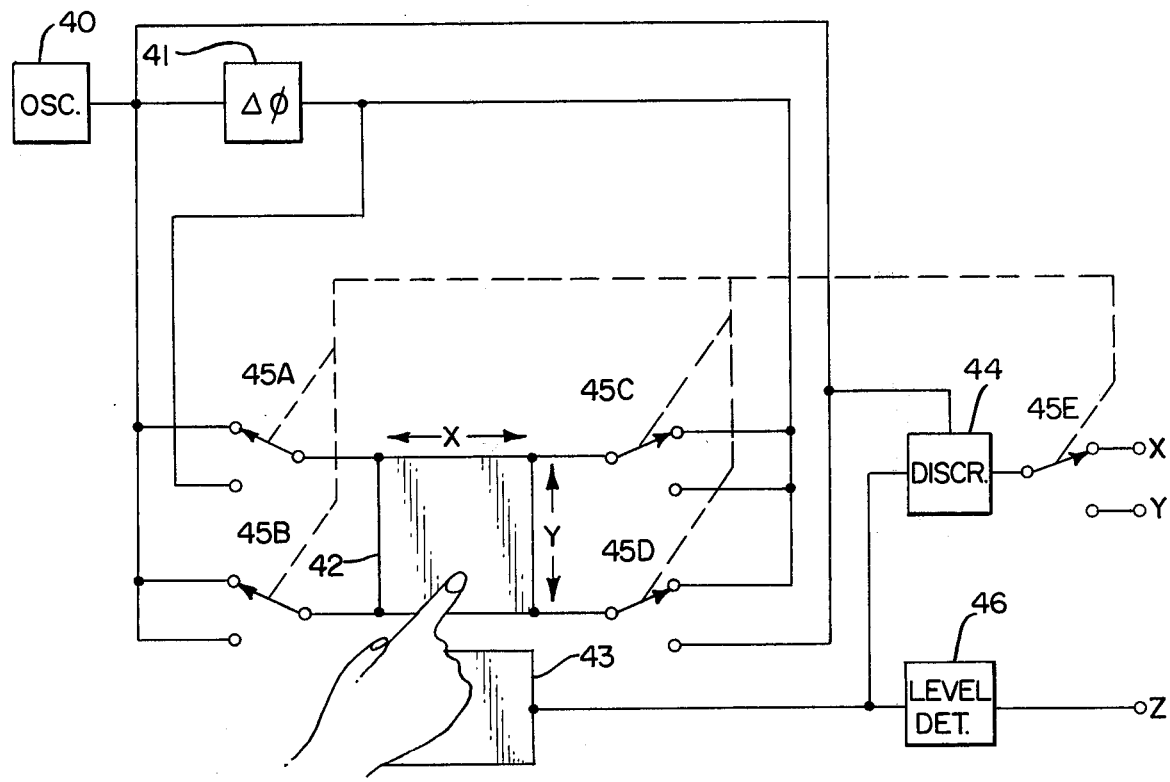
FIG. 6 is a simplified diagrammatic representation of an alternate two-axis embodiment of this invention employing multiplexing of phase connections and output connections.

FIG. 6 represents an alternate two-axis embodiment in which multiplexing is used instead of duplication of oscillators, phase shifters, and discriminators. The circuit is similar to that shown in FIG. 1 except for the addition of the switches and a level detector, which was omitted from FIG. 1 for simplicity. An alternating voltage is generated by oscillator 40 and shifted 90° in phase by phase shifter 41. The two signals are applied to opposite sides of phase surface 42, which is a square of resistive material. Pickup surface 43 picks up the signal from the hand of the operator, and discriminator 44 recovers the phase information from the signal. Switch 45 multiplexes the circuitry by first connecting the two input signals to the phase surface to as to produce a phase field along the X axis, and simultaneously connecting the discriminator output to the X output connection: and then connecting the input signals to the Y axis of the phase surface and the discriminator output to the Y output connection. Level detector 46 indicates the presence of the operator'hand.

What I claim as new and desire to secure by Letters Patent is:

1. A human-machine interface apparatus for inputting information to a utilization device, comprising: means for defining a surface of predetermined length and having a reference point thereon; field-establishing means for establishing a low level electric field above said surface and along said predetermined length and into which a human finger can be inserted to touch a selected point on said surface and traverse a path therealong, said electric field having a parameter that varies continuously along said predetermined length as a function of distance from said reference point; and detector means for detecting the position of said touched point on said surface and the path traversed thereby with respect to said reference point and producing an electrical signal corresponding thereto as an input signal to said utilization device.

2. A human-machine interface apparatus as defined in claim 1 wherein said field-establising means includes an impedance element in said surface and an alternating electrical voltage source connected to separated points on said impedance element, and the parameter which varies is the phase of the voltage along said impedance element.

3. A human-machine interface apparatus as defined in claim 2 including a first surface with field-establishing means for establishing an alternating electric field above said first surface with its phase, relative to a reference point on said first surface, changing continuously as a function of position along an axis of said first surface; a second surface located in such a way relative to said first surface that when the operator of said interface apparatus touches said first surface with his finger an electrical signal can be transmitted through some part of his body into said second surface; and phase discriminator means for determining the phase of the signal transmitted to said second surface with respect to the phase at said reference point on said first surface, the output of said phase discriminator means being a signal that is a function of the position of said operator's finger on said first surface.

4. A human-machine interface apparatus as defined in claim 3 including switching means for changing the axis of said first surface along which the phase of said alternating electric field changes as a function of distance, thereby providing two or more output signals that are functions of the position of said operator's finger along two or more axes of said first surface.

5. A human-machine interface apparatus as defined in claim 3 with duplication of said field-establishing means in such a way that two or more alternating electric fields of different frequencies are created above said first surface, each with its phase, relative to a reference point on said first surface, changing as a function of position along a different axis of said first surface; with duplication of the phase dicriminator means; and with provision of frequency discrimination means such that each phase discriminator means responds only to the appropriate frequency; thereby providing output signals that are functions of the position of said operator's finger along two or more axes of said first surface.

6. A human-machine interface apparatus as defined in claim 3 in which said impedance element is a resistive element and said field-establishing means constitute means for applying alternating voltage inputs to separated points on said resistive element with the phase of the input to one point different from and in predetermined relationship with the phase of the input to the other point.

7. A human-machine interface apparatus as defined in claim 6 with switching means for changing the axis of said first surface along which the phase of said alternating electric field changes as a function of position, thereby providing two or more output signals that are functions of the position of said operator's finger along two or more axes of said first surface 8. A human-machine interface apparatus as defined in claim 6 with duplication of said field-establishing means in such a way that two or more alternating electric fields of different frequencies are created above said first surface, each with its phase, relative to a reference point on said first surface, changing as a function of position along a different axis of said first surface; with duplication of the phase discriminator means; and with provision of frequency discrimination means such that each phase discriminator means reponds only to the appropriate frequency; thereby providing output signals that are functions of the position of said operator's finger along two or more axes of said first surface.

9. A human-machine interface apparatus as defined in claim 3 in which said impedance element includes a layer of resistive material, a conductive ground plane, and a layer of insulating material separating said layer of resistive material from said conductive ground plane; and said field-establishing means constitutes means for applying an alternating voltage input to one point on said layer of resistive material, and electrically terminating another point on said layer of resistive material with a resistance element.

10. A human-machine interface apparatus as defined in claim 9 with switching means for changing the axis of said first surface along which the phase of said alernating electric field changes as a function of position, thereby providing two or more output signals that are functions of the position of said operator's finger along two or more axes of said first surface.

11. A human-machine interface apparatus as defined in claim 9 with duplication of said field-establishing means in such a way that two or more alternating electric fields of different frequencies are created above said first surface, each with its phase, relative to a reference point on said first surface, changing as a function of position along a different axis of said first surface; with duplication of the phase discriminator means; and with provision of frequency discrimination means such that each phase discriminator means responds only to the appropriate frequency; thereby providing output signals that are functions of the position of said operator's finger along two or more axes of said first surface.

12. A human-machine interface apparatus as defined in claim 3 wherein said second surface is located in such a way relative to said first surface that when said operator touches said first surface with a finger of one hand, the heel of said hand passes above or touches said second surface, transmitting an electrical signal from said first surface to said second surface.

13. A human-machine interface apparatus as defined in claim 12 including switching means for changing the axis of said first surface along which the phase of said alternating electric field changes as a function of distance, thereby providing two or more output signals that are functions of the position of said operator's finger along two or more axes of said first surface.

14. A human-machine interface apparatus as defined in claim 12 including a further field-establishing means connected to said first surface in such a way that two or more alternating electric fields of different frequencies are created above said first surface, each with its phase, relative to a reference point on said first surface, changing as a function of position along a different axis of said first surface; a further phase discriminator means; and frequency discrimination means such that each phase discriminator means responds only to the appropriate frequency thereby providing output signals that are functions of the position of said operator's finger along two or more axes of said first surface.

15. A human-machine interface apparatus as defined in claim 12 in which said impedance element is a resistive element and said field-establishing means constitute means for applying alternating voltage inputs to separated points on said resistive element with the phase of the input to one point different from and in predetermined relationship with the phase of the input to the other point.

16. A human-machine interface apparatus as defined in claim 15 with switching means for changing the axis of said first surface along which the phase of said alternating electric field changes as a function of position, thereby providing two or more output signals that are functions of the position of said operator's finger along two or more axes of said first surface.

17. A human-machine interface apparatus as defined in claim 15 including a further field-establishing means connected to said first surface in such a way that two or more alternating electric fields of different frequencies are created above said first surface, each with its phase, relative to a reference point on said first surface, changing as a function of position along a different axis of said first surface; a further phase discriminator means; and frequency discrimination means such that each phase discriminator means responds only to the appropriate frequency; thereby providing output signals that are functions of the position of said operator'finger along two or more axes of said first surface.

18. A human-machine interface apparatus as defined in claim 12 in which said impedance element includes a layer of resistive material, a conductive ground plane, and a layer of insulating material separating said layer of resistive material from said conductive ground plane; and said field-establishing means constitutes means for applying an alternating voltage input to one point on said layer of resistive material, and electrically terminating another point on said layer of resistive material with a resistance element.

19. A human-machine interface apparatus as defined in claim 18 with switching means for changing the axis of said first surface along which the phase of said alternating electric field changes as a function of position, thereby providing two or more output signals that are functions of the position of said operator's finger along two or more axes of said first surface.

20. A human-machine interface appartus as defined in claim 18 including a further field-establishing means connected to said first surface in such a way that two or more alternating electric fields of different frequencies are created above said first surface, each with its phase, relative to a reference point on said first surface, changing as a function of position along a different axes of said first surface; a further phase discriminator means; and frequency discrimination means such that each phase discriminator means responds only to the appropriate frequency; thereby providing output signals that are functions of the position of said operator's finger along two or more axes of said first surface.

21. A method of inputting data from a human to a utilization device comprising: establising a pair of orthogonally oriented electric fields over a predetermined surface, having x and y axes, each said electric field being oriented with respect to an axis and having a parameter that varies continuously as a function of position along said predetermined surface; inserting a human finger into said electric field to touch said surface at any selected x-y coordinates and producing a signal in the touching finger containing a component of the x oriented field and a component of the y oriented field as functions of the position of the inserted finger where it touches said surface, converting said components to a utilization signal and applying same to said utilization device.

* * * * *